United States Patent
Craig

(10) Patent No.: US 10,121,387 B1
(45) Date of Patent: Nov. 6, 2018

(54) PIANO CARDS MUSIC THEORY TEACHING METHOD AND APPARATUS

(71) Applicant: James Craig, Media, PA (US)

(72) Inventor: James Craig, Media, PA (US)

( * ) Notice: Subject to any disclaimer, the term of this patent is extended or adjusted under 35 U.S.C. 154(b) by 0 days.

(21) Appl. No.: 15/867,962

(22) Filed: Jan. 11, 2018

Related U.S. Application Data

(60) Provisional application No. 62/449,630, filed on Jan. 24, 2017.

(51) Int. Cl.
- G09B 15/08 (2006.01)
- G09B 15/00 (2006.01)
- G09B 1/00 (2006.01)
- G09B 15/02 (2006.01)

(52) U.S. Cl.
CPC ............ G09B 15/004 (2013.01); G09B 1/00 (2013.01); G09B 15/007 (2013.01); G09B 15/026 (2013.01)

(58) Field of Classification Search
CPC ...... G09B 15/004; G09B 1/00; G09B 15/007; G09B 15/026
USPC .......... 84/481, 470 R, 471 R, 472, 473, 474, 84/475, 477 R
See application file for complete search history.

(56) References Cited

U.S. PATENT DOCUMENTS

| | | | |
|---|---|---|---|
| 1,017,045 A | 2/1912 | French et al. | 84/480 |
| 2,221,143 A | 11/1940 | Lang | 84/478 |
| 3,101,023 A | 8/1963 | Weis et al. | 84/480 |
| 3,350,973 A | 11/1967 | Weis et al. | 84/480 |
| 3,395,600 A | 8/1968 | Loenard | 84/480 |
| 3,707,897 A | 1/1973 | Hertz | 84/479 |
| 3,733,956 A | 5/1973 | Leonard | 84/471 |
| 3,888,155 A | 6/1975 | Leonard | 84/471 |
| 4,041,828 A | 8/1977 | Leonard | 84/471 |
| 6,841,724 B2 | 1/2005 | George | 84/480 |
| 7,314,991 B2 | 1/2008 | Carlson | 84/480 |
| 7,514,621 B2 | 4/2009 | Beaulieu | 84/470 |
| 7,875,785 B2 | 1/2011 | Hammond | 84/470 |
| 7,897,861 B2 | 3/2011 | DeLong et al. | 84/470 |
| 2010/0005952 A1 | 1/2010 | LaMon | 84/478 |
| 2013/0319207 A1* | 12/2013 | King | G09B 15/023 84/471 R |
| 2013/0319208 A1* | 12/2013 | Forrest | G09B 15/002 84/478 |
| 2014/0305284 A1* | 10/2014 | Cosgrove | G09B 15/001 84/478 |

(Continued)

*Primary Examiner* — Jianchun Qin

(74) *Attorney, Agent, or Firm* — Douglas J. Petock; Petock & Petock, LLC

(57) ABSTRACT

A system of teaching piano playing and music theory having piano cards. Piano cards are a flash card system with piano note information on each card. These piano cards are placed above piano keys of a piano or other keyboard designating keys to be played in a specific scale. Black and white triangles on these piano cards designate ebony and ivory keys to be played and can only be placed on a keyboard correctly if aligning white and black triangles with ebony and ivory keys. Triangles designate fingers to be used on fingering cards by way of numbers designating fingers. On music theory cards numbers inside triangles designate scale degrees. On chord cards numbers designate degrees to be played. This music teaching system further comprises a music wheel that has been color coded designating the key a scale is in.

13 Claims, 16 Drawing Sheets

(56) References Cited

U.S. PATENT DOCUMENTS

2015/0068387 A1* 3/2015 Shi .................. G09B 15/023
                                                84/471 R
2015/0317910 A1* 11/2015 Daniels ............ G09B 19/003
                                                84/485 R

* cited by examiner

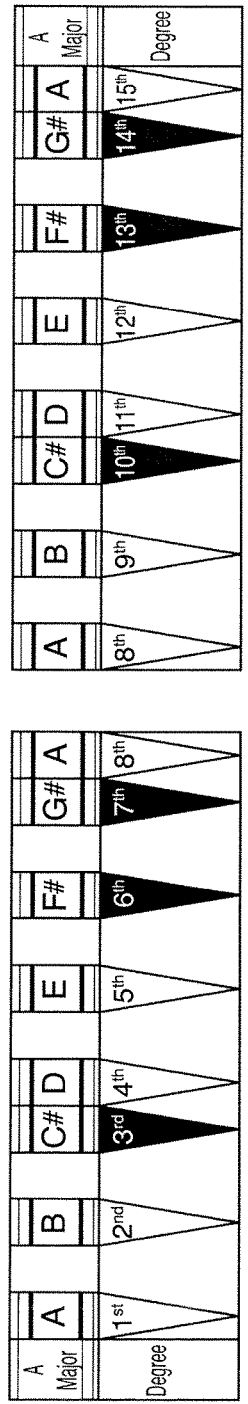
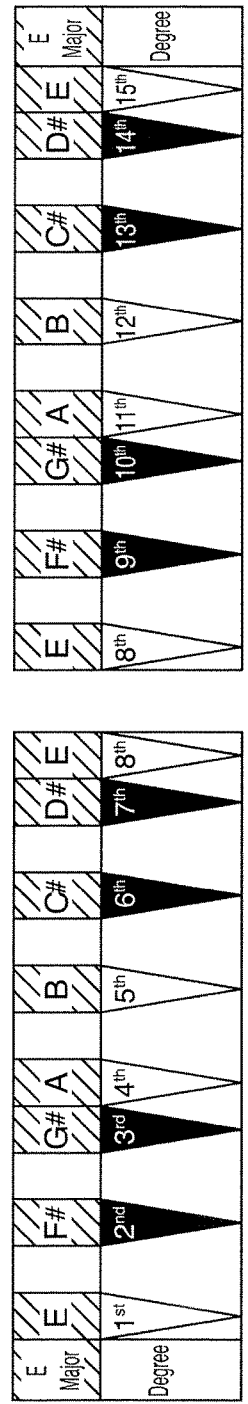
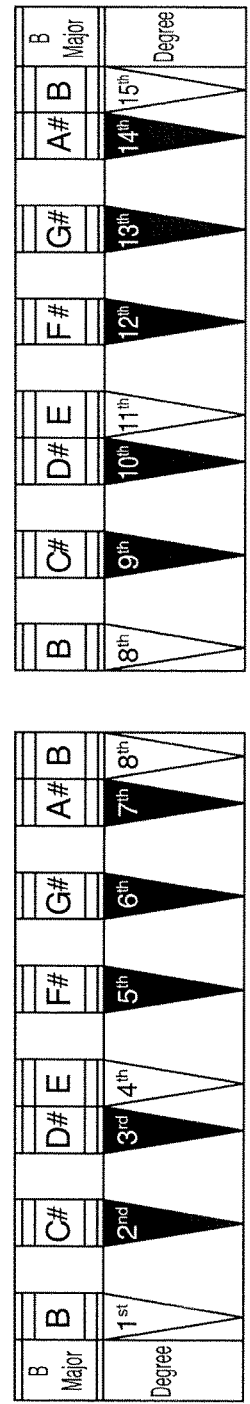
FIG. 4D
FIG. 4E
FIG. 4F

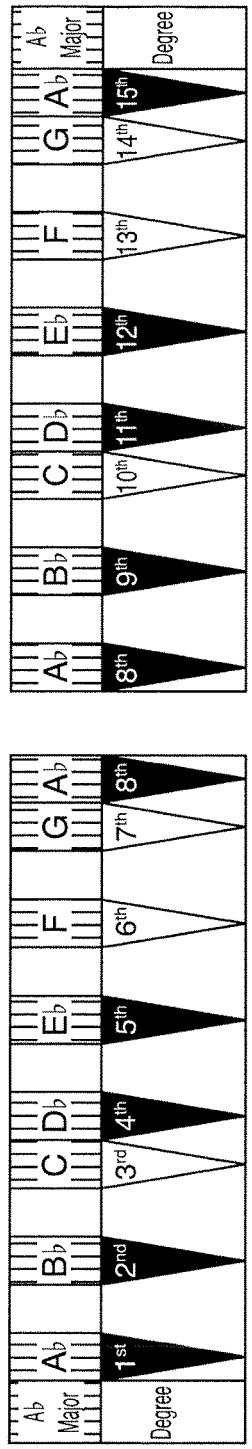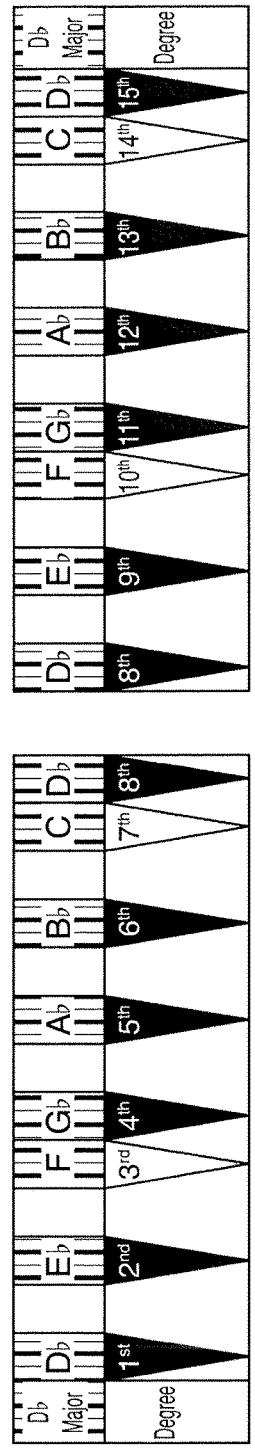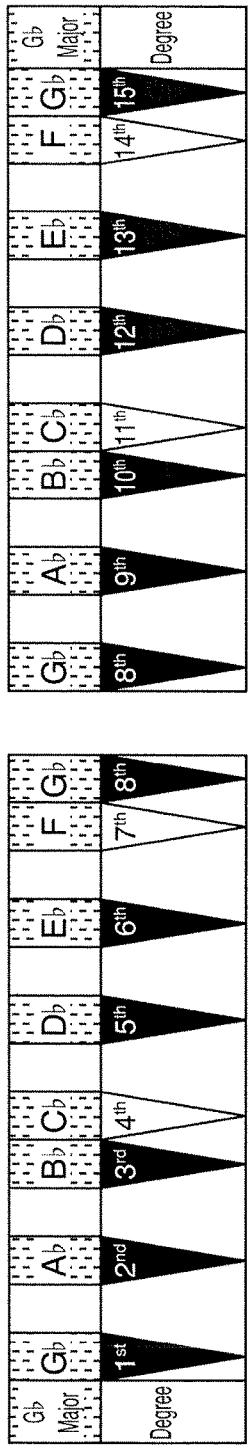

Yellow

Yellowish Orange

Orange

Reddish Orange

Red

Purple

Light Blue

Darker Blue

Bright Blue

Bluish Green

Dark Green

Light Green

PIANO CARDS MUSIC THEORY TEACHING METHOD AND APPARATUS

CLAIM OF PRIORITY

This application claims the benefit of U.S. Provisional Application No. 62/449,630, filed Jan. 24, 2017.

FIELD OF THE INVENTION

The present invention relates to music teaching methods. More particularly, the present invention relates to piano teaching template cards showing fingering, music theory and chords.

BACKGROUND OF THE INVENTION

Piano teaching apparatus have been created since the piano was invented. Many of them are over complicated and difficult for the unindoctrinated student and novice. In U.S. Pat. No. 7,897,861 B2 DeLong, et al. attempt to solve complications in piano/keyboard instruction by disclosing guide templates for piano keyboard scale fingering for left and right hands and methods of using the guide templates in order to simplify learning the correct fingering sequences of scale variations. But DeLong does not suggest an easy way for the uninitiated and unindoctrinated student to place the template in its proper position. Further, DeLong's templates lack instructional information important to music theory learning. DeLong's plates have no built in feature to align them with a keyboard if moved or unaligned by wind, mistake or other force.

SUMMARY OF THE INVENTION

An advantage of the present invention is that it teaches music theory to the novice.

Another advantage of the present invention is that the music cards can only be aligned properly if black and white indicators are matched to corresponding keys.

Another advantage of the present invention is that it is easy to align on a piano.

Another advantage of the present invention is that it easily fits on the nameboard rail of a standard upright piano.

Another advantage of the present invention is that the piano cards may be used with the music wheel to further understand the theory behind the cards.

Briefly and basically in accordance with the present invention there is provided a method of teaching piano playing and music theory comprising piano cards. These piano cards are placed above piano keys of a piano or other keyboard designating keys to be played in a specific scale. Black and white triangles on these piano cards designate ebony and ivory keys to be played and can only be placed on a keyboard correctly if aligning white and black triangles with ebony and ivory keys. Triangles designate fingers to be used on fingering cards by way of numbers designating fingers. On music theory cards numbers inside triangles designate scale degrees. On chord cards numbers designate degrees to be played. This music teaching system further comprises a music wheel that has been color coded designating the key a scale is in. This color coding corresponds to a color code on each card. A chord formula sheet is also included designating how to make chords with the scales learned thru the system.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities.

FIG. 4 A is a top view of a theory card doublet in the key of C.

FIG. 4 B is a top view of a theory card doublet in the key of G.

FIG. 4 C is a top view of a theory card doublet in the key of D.

FIG. 4 D is a top view of a theory card doublet in the key of A.

FIG. 4 E is a top view of a theory card doublet in the key of E.

FIG. 4 F is a top view of a theory card doublet in the key of B.

FIG. 4 G is a top view of a theory card doublet in the key of F.

FIG. 4 H is a top view of a theory card doublet in the key of E♭.

FIG. 4 I is a top view of a theory card doublet in the key of B♭.

FIG. 4 J is a top view of a theory card doublet in the key of A♭.

FIG. 4 K is a top view of a theory card doublet in the key of D♭.

FIG. 4 L is a top view of a theory card doublet in the key of G♭.

FIG. 5(A-J) is a top view of group of chord cards and some chord card doublets.

DETAILED DESCRIPTION OF PRESENTLY PREFERRED EMBODIMENTS

Figure 1:
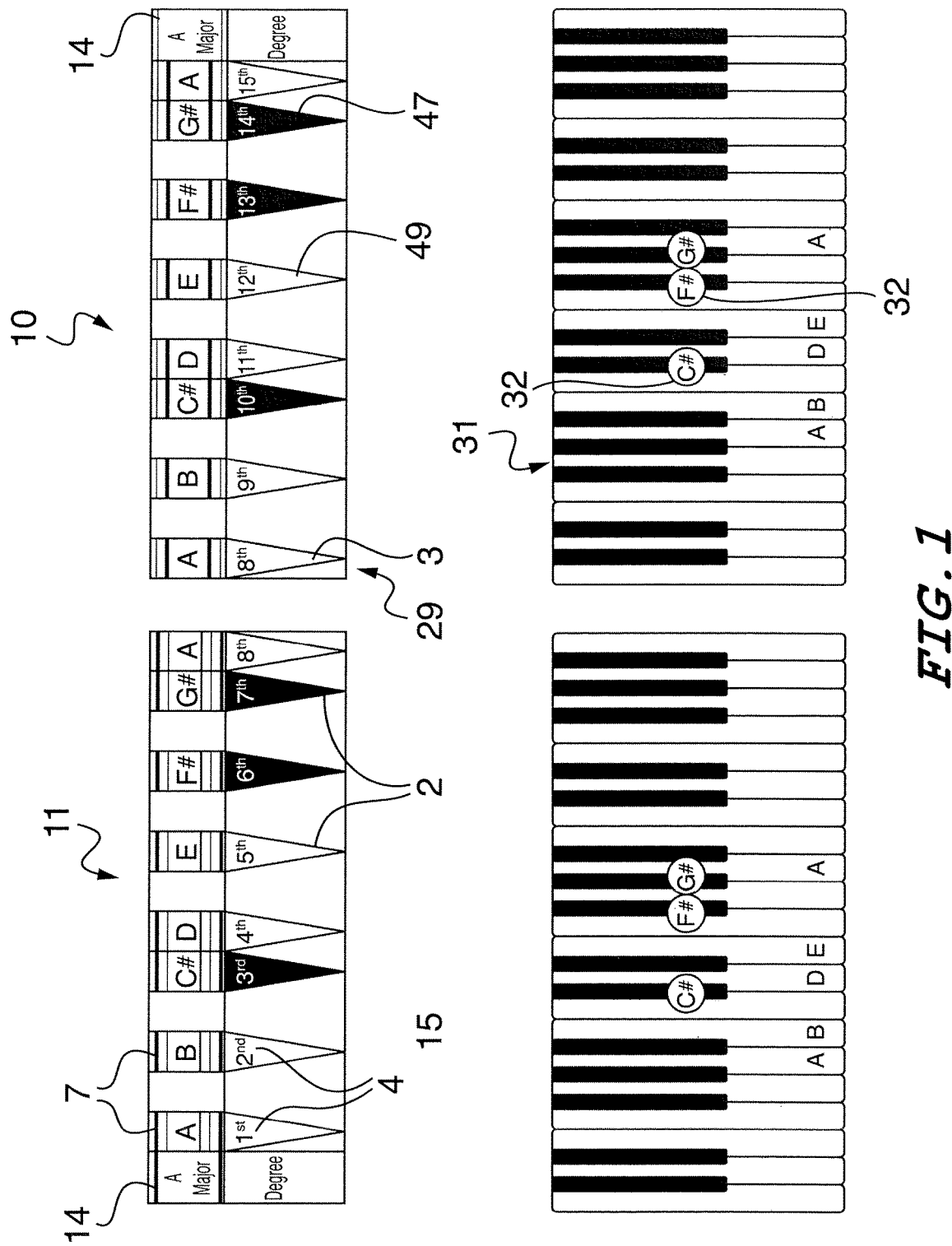
FIG. 1 is a top view of a theory card doublet above and a second side view of the same theory card doublet below.
Figure 2A:
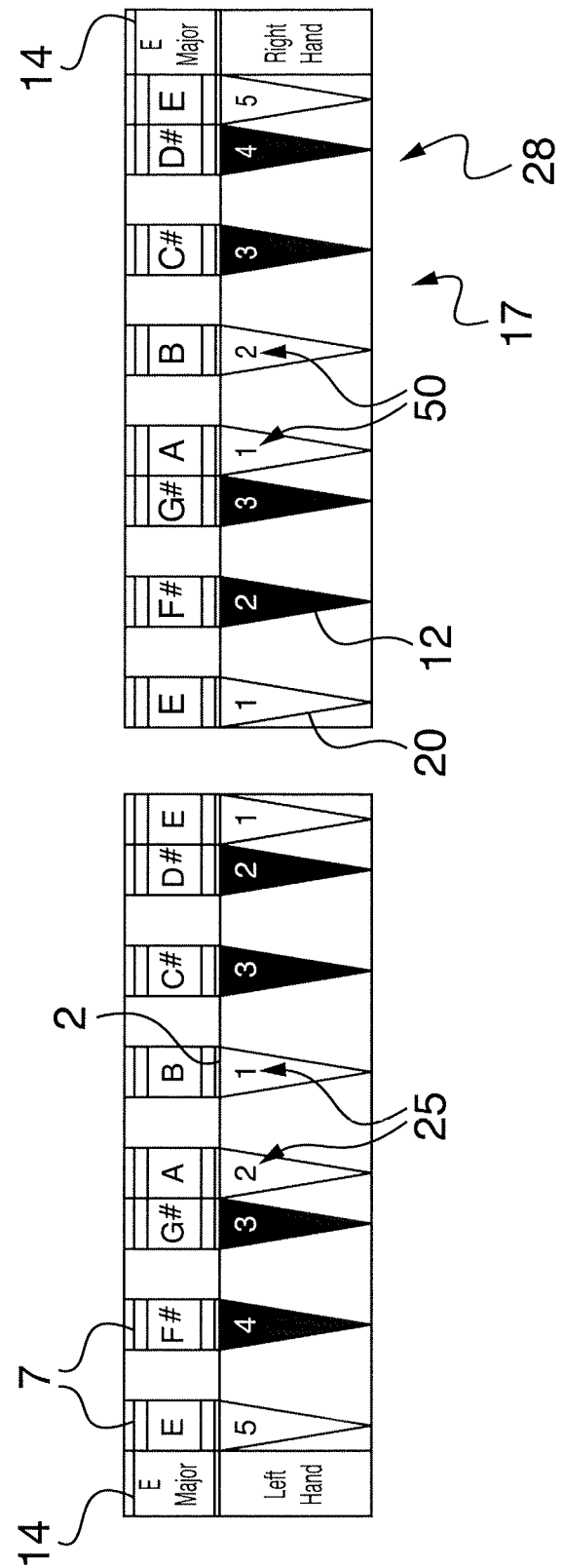
FIG. 2A is a top view of a fingering card doublet.
Figure 2B:
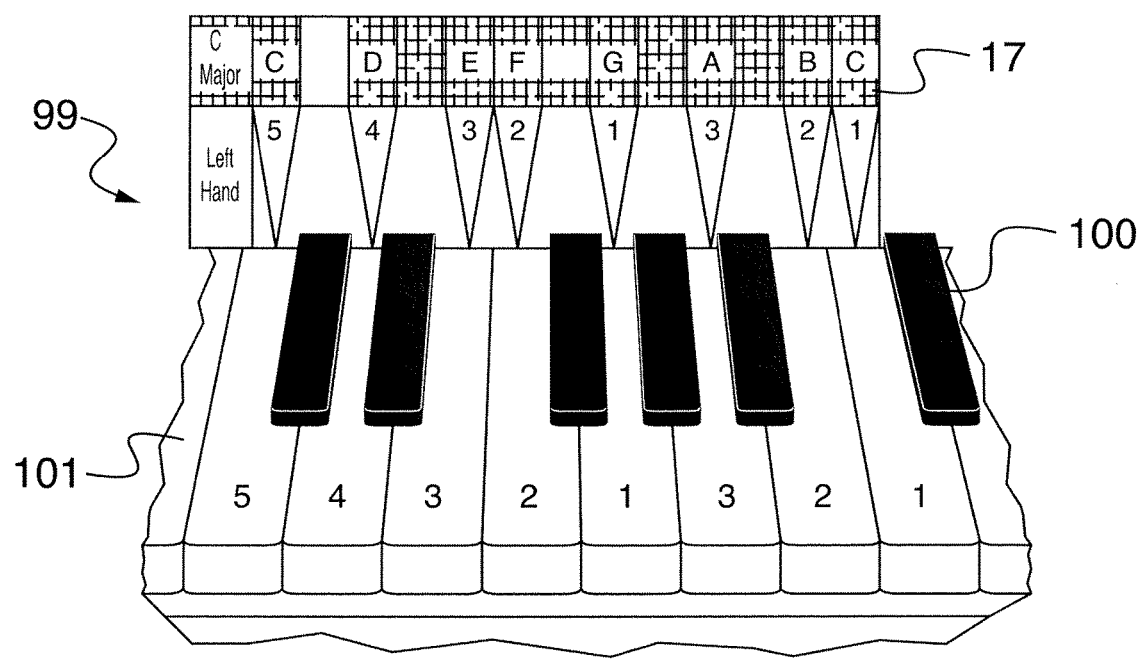
FIG. 2B is a top view of fingering card instruction/alignment card.
Figure 2B:
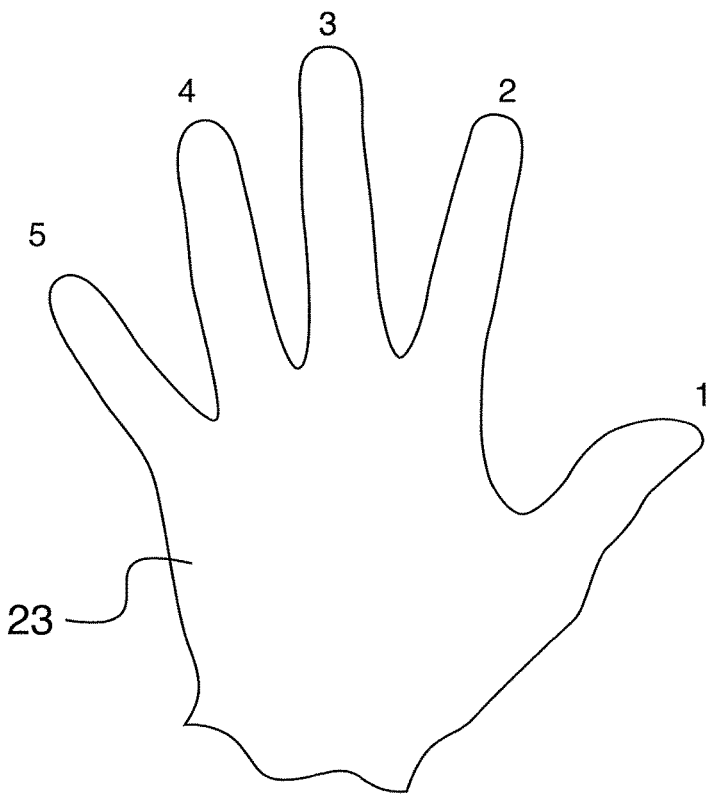

Referring now to the drawings in detail, wherein like numerals indicate like elements, there is shown in FIG. 1 a theory card doublet above and a second side view of the same theory card doublet below.

Theory cards are part of an Apparatus for teaching music and the piano. For the purposes of this application piano is defined as any keyboard instrument that has the same keys and note configuration as a piano. The apparatus teaches music with piano cards. These piano cards teach aspiring pianists the degrees of a scale or other musical set. Shown in FIG. 1 is a piano card. More specifically shown in FIG. 1 are theory card piano cards 15. Each theory piano card 15 contains the notes pertaining to a particular musical scale in the form of key indicators 2. FIG. 1 shows a presently preferred embodiment wherein key indicators 2 contain the form of triangles 3 pointing downwards towards the keys to be played. These triangles 3 are filled in white for ivory keys and black for ebony keys. When the key indicators 2 are colored black and white in this way 99 and aligned on a piano so that white indicators only point to white keys and black indicators point to black keys most of these piano cards can only be aligned correctly 99. If they are misaligned one or more ebony key indicators will be pointing to white keys and one or more white indicators will be pointing to black keys. Inside each triangle 3 there are degree indicator symbols 4. In FIG. 1 these degree indicator symbols 4 are in the form of alphanumeric representation, more specifically: 1st 2nd 3rd 4th 5th 6th 7th 8th and so on. Above each triangle there are note indicator symbols 7. These note indicator symbols 7 are in the form of rectangular boxes and are colored in according to a color coding scheme pertaining to the key of the scale of that particular piano card. Inside each rectangular box of note indicator symbols 7 there are alpha numeric representations of each note indicated by key indicator symbols. There are right hand and left handed piano cards. Right hand piano cards 10 are to be played by a pianist's right hand. Left hand piano cards 11 are to be played by a pianist's left hand. Musical key indicator boxes 14 are located on the right side of right handed piano cards 10 and on the left side of left handed piano cards 11. Musical key indicator boxes 14 indicate the key of the scale of that piano card.

The system has three kinds of piano cards: theory cards 15, fingering cards 17 and chord cards 19. Theory cards 15 contain key indicators 2 that have a number indicating the degree of the piano key indicated in the scale of that card. The number is inside the key indicator triangle 3. Fingering piano cards 17 have numbers, inside their key indicator triangles 25, indicating the finger to be used to play the key indicated by the key indicator. In this fingering system 23 thumb is a "1", index finger is a "2", middle finger is a "3", ring finger is a "4" and pinky finger is a "5". Chord cards 19 are similar to theory cards 15 in that they contain the degree of the key indicated by each key indicator 2 in their key indicator triangles however chord cards do not represent a full scale but rather only a chord. Theory piano cards 15, fingering cards 17 and chord cards 19 are currently arranged in doublets, one left handed and one right handed card. Each card in a fingering card doublet 28 and each card in a theory card doublet 29 contain the full scale indicated by its musical key indicator box 14. To play both cards consecutively each card must be aligned above the piano keys on separate octaves. Chord cards also may come in chord card doublets 30 but are representative of chords. Chords of cards are indicated in chord indicator boxes 1.

Figure 3A:
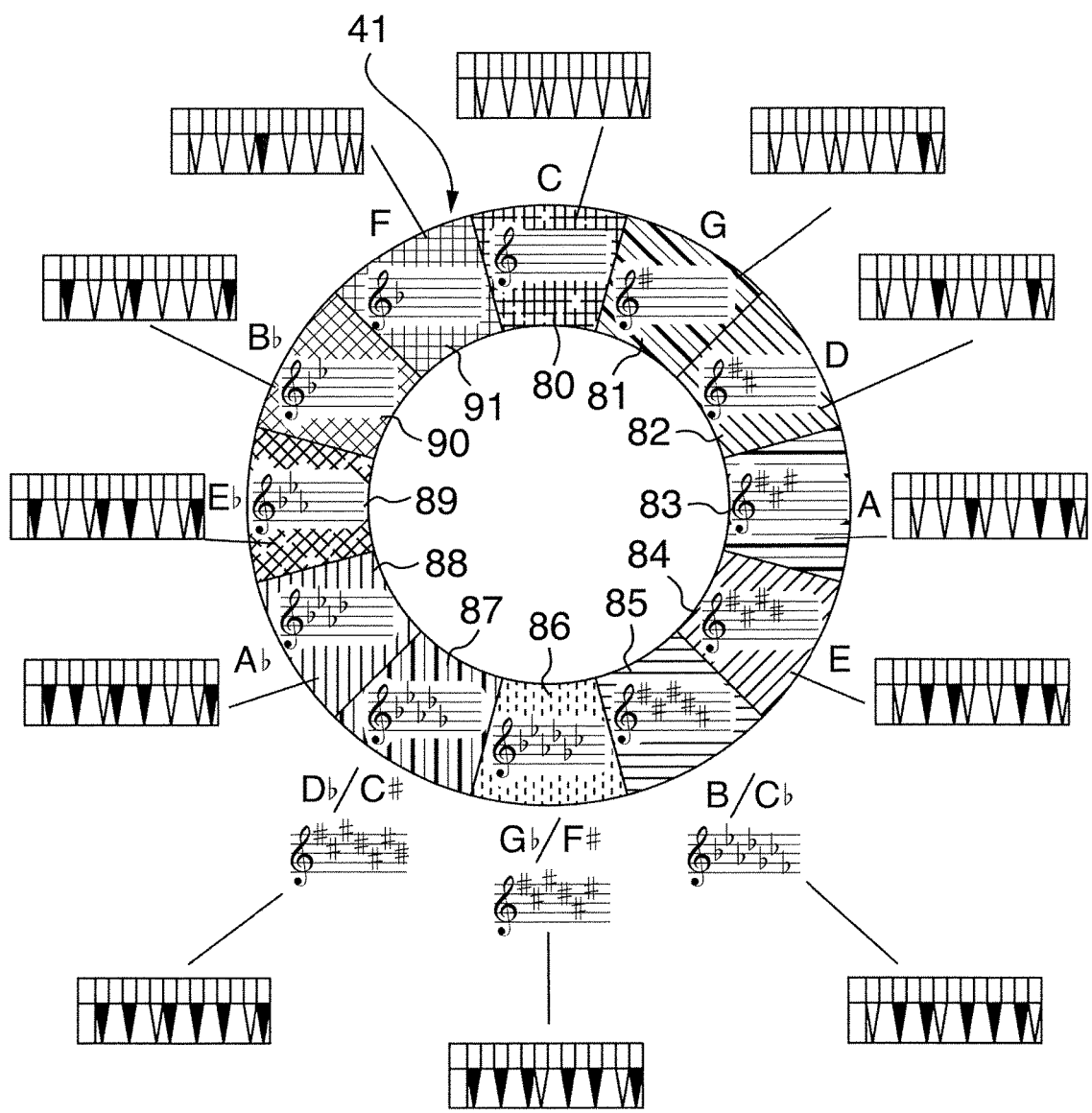
FIG. 3A is a top diagram of a music wheel with corresponding theory cards connected by lines.
Figure 3B:
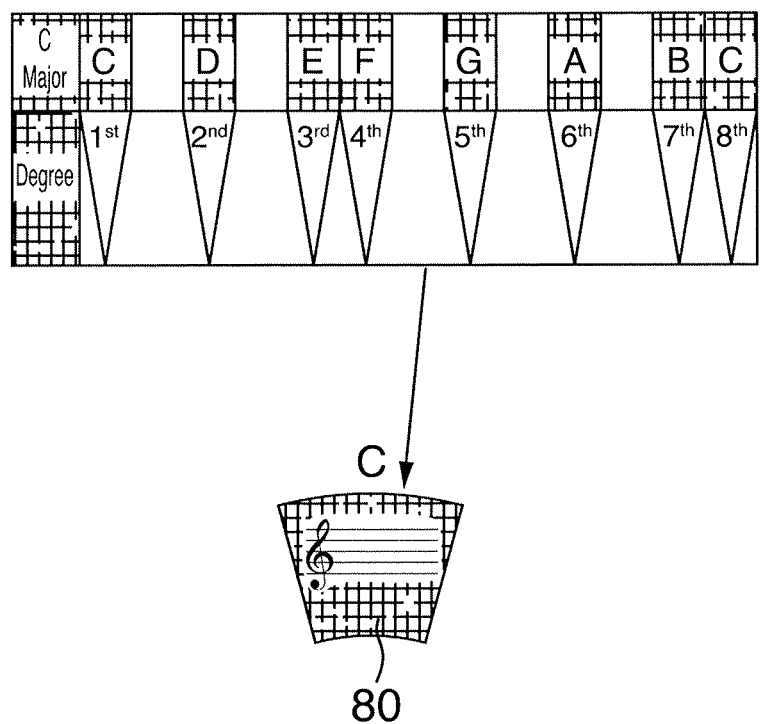
FIG. 3B is a more detailed view of one section of a music wheel with a line connecting that section's corresponding theory card.
Figure 4A:
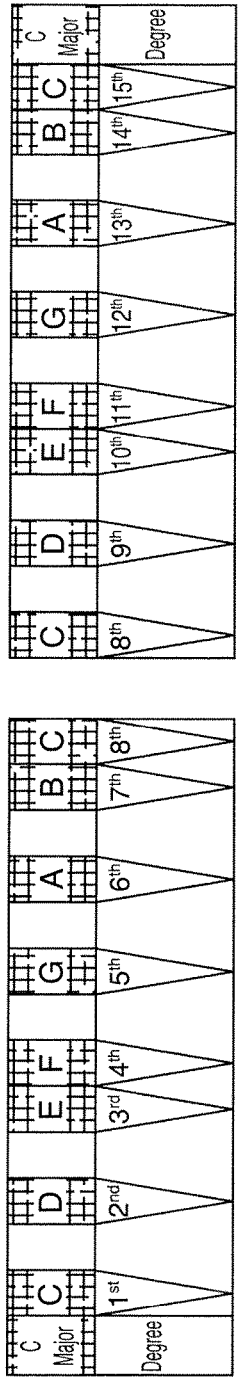
FIG. 4(A-L) is a top view of a full mode set of theory card doublets.
Figure 4B:
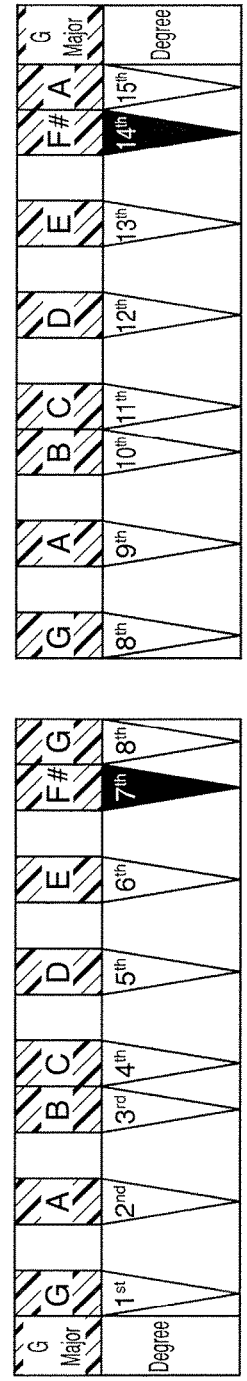
Figure 4C:
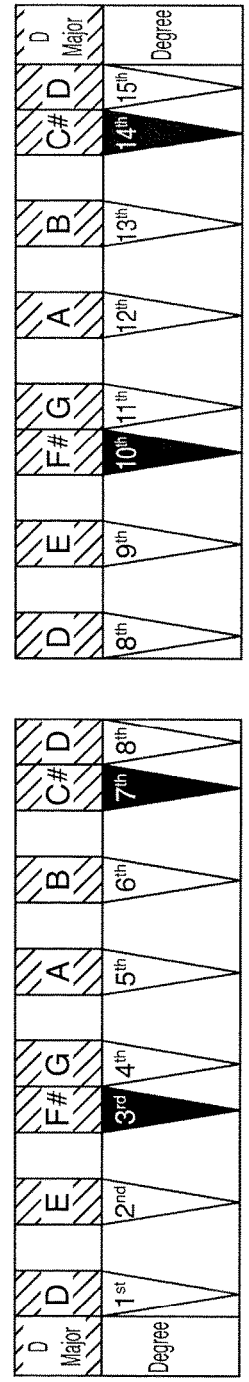
Figure 4G:
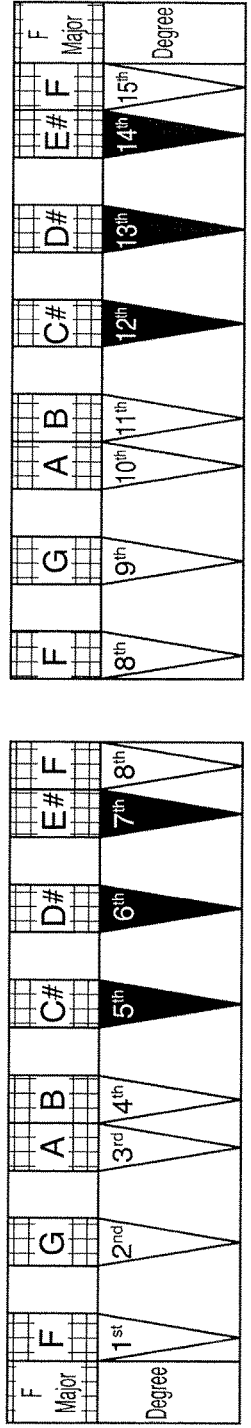
Figure 4H:
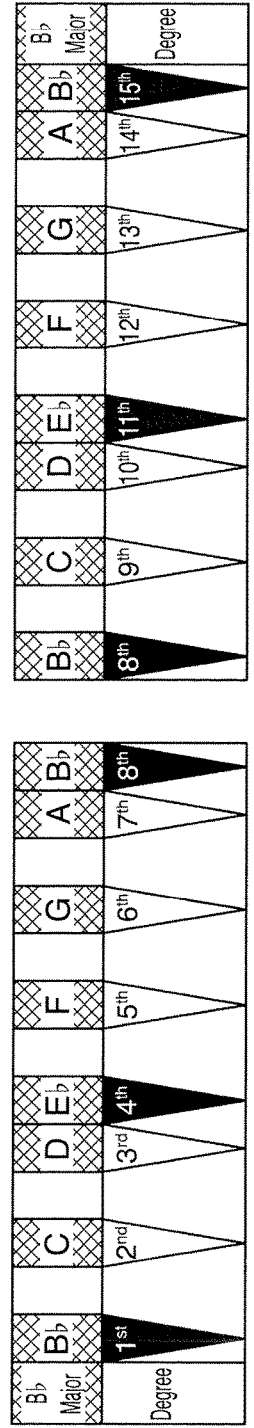
Figure 4I:
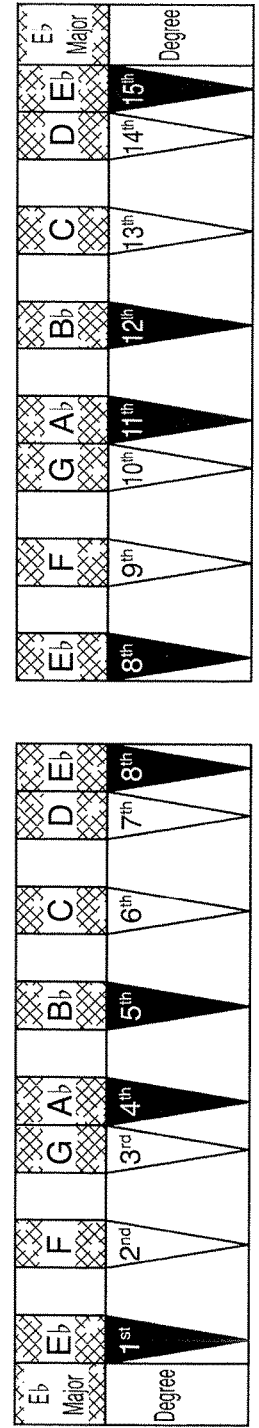
Figure 5A:
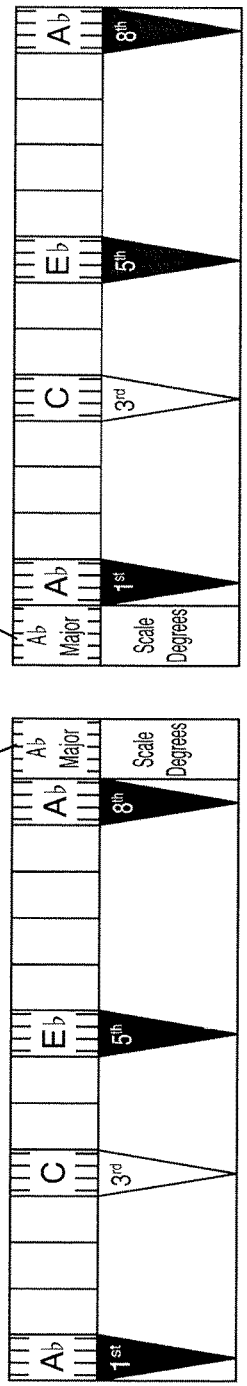
FIG. 5A is a top view of a fingering card doublet in the key of A♭.
Figure 5B:
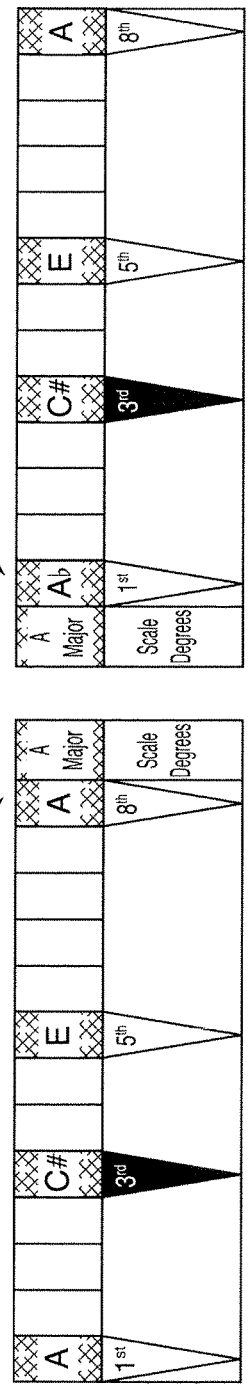
FIG. 5B is a top view of a fingering card doublet in the key of A.
Figure 5C:
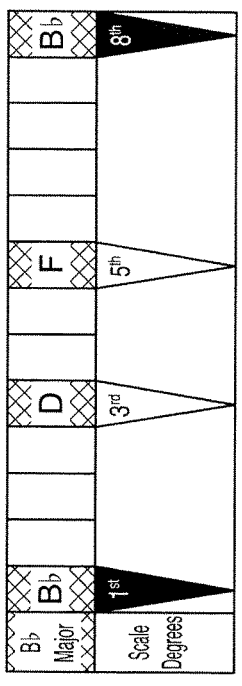
FIG. 5C is a top view of a fingering card in the key of B♭.
Figure 5D:
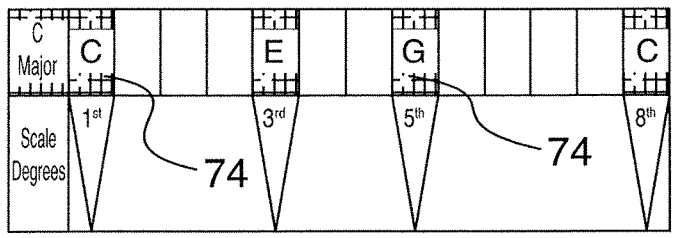
FIG. 5D is a top view of a fingering card in the key of C.
Figure 5E:
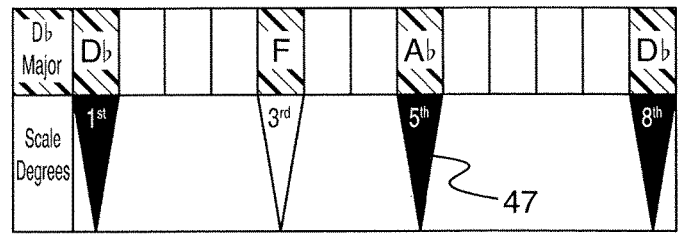
FIG. 5E is a top view of a fingering card in the key of D♭.
Figure 5F:
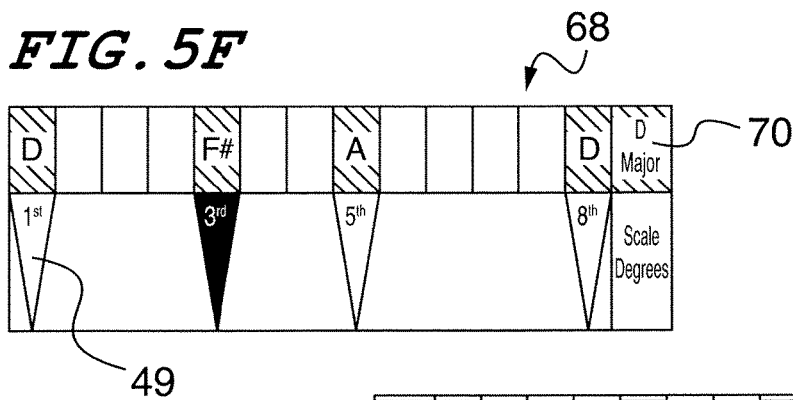
FIG. 5F is a top view of a fingering card in the key of D.
Figure 5G:
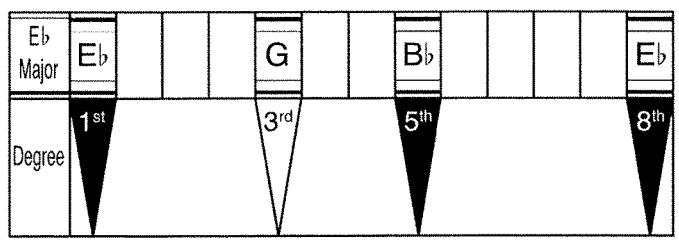
FIG. 5G is a top view of a fingering card in the key of E♭.
Figure 5H:
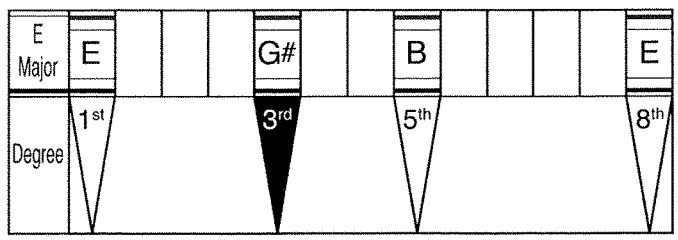
FIG. 5H is a top view of a fingering card in the key of E.
Figure 5I:
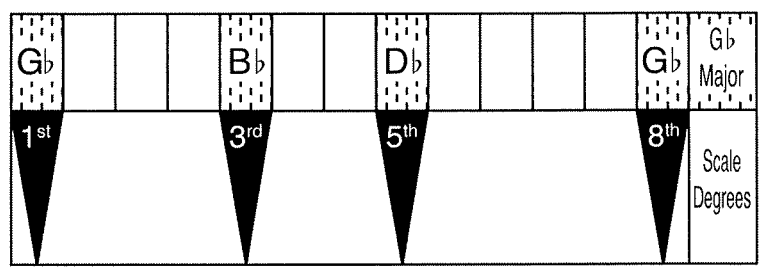
FIG. 5I is a top view of a fingering card in the key of G♭.
Figure 5J:
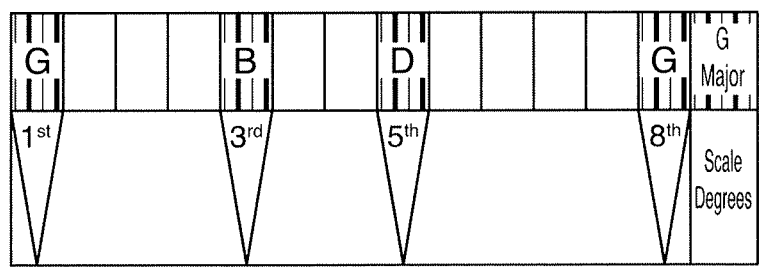
FIG. 5J is a top view of a fingering card in the key of G.
Figure 6A:
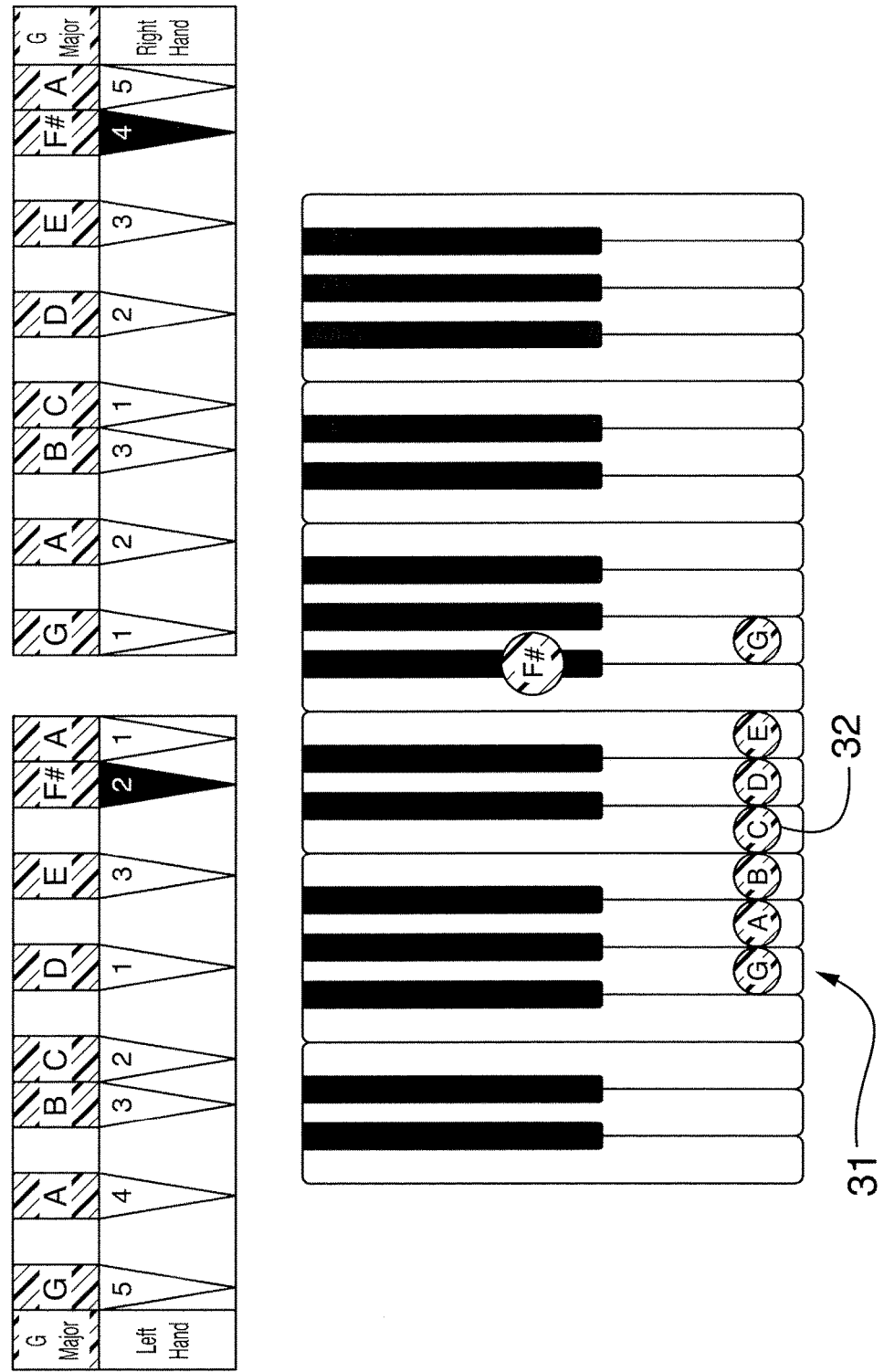
FIG. 6A is a top view of one left handed and one right handed fingering card and one second side of a fingering card.
Figure 6B:
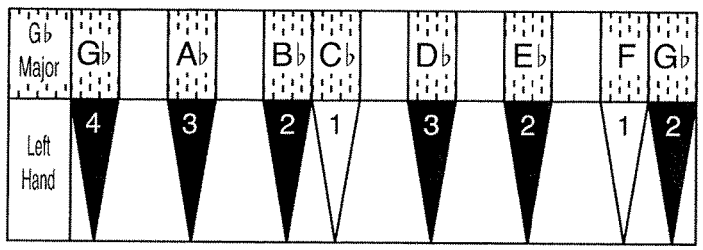
FIG. 6B is a top view of a fingering card.
Figure 6C:
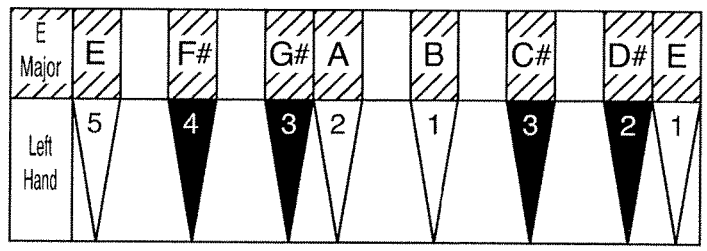
FIG. 6C is a top view of a fingering card.
Figure 6D:
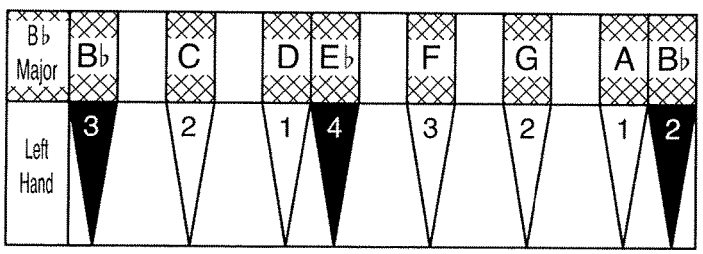
FIG. 6D is a top view of a fingering card.
Figure 6E:
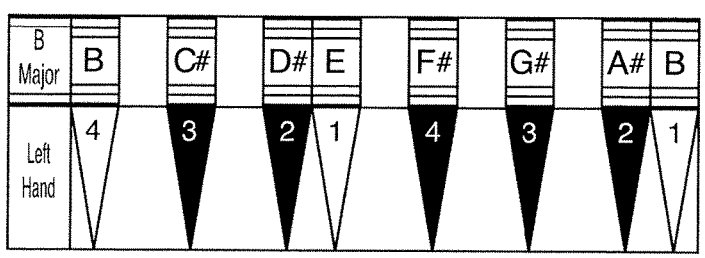
FIG. 6E is a top view of a fingering card.
Figure 6F:
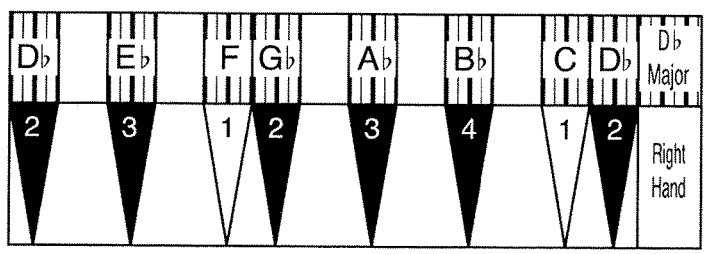
FIG. 6F is a top view of a fingering card.
Figure 6G:
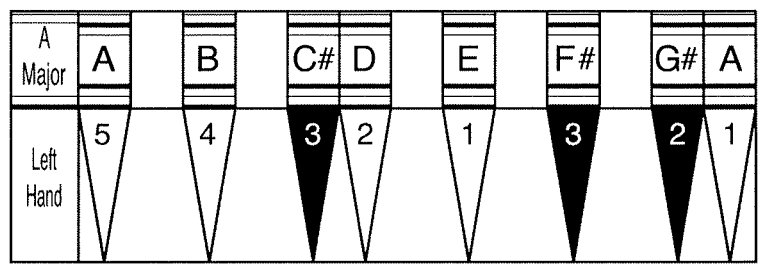
FIG. 6G is a top view of a fingering card.
Figure 6H:
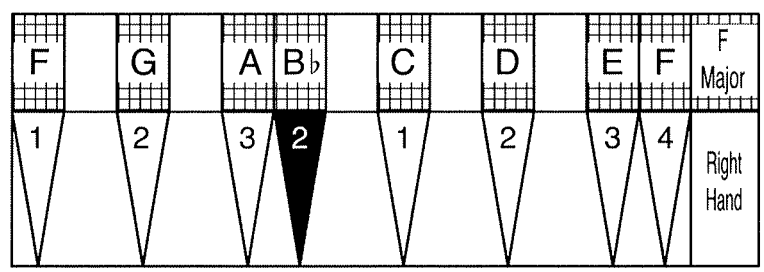
FIG. 6H is a top view of a fingering card.
Figure 7:
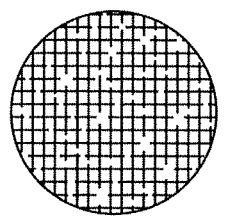
FIG. 7 is a color key.
Figure 7:
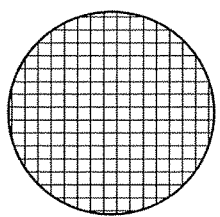
Figure 7:
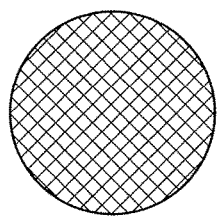
Figure 7:
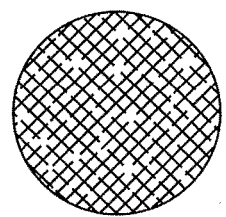
Figure 7:
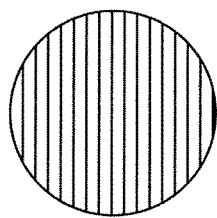
Figure 7:
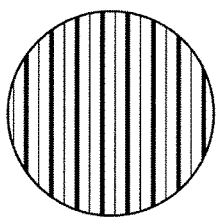
Figure 7:
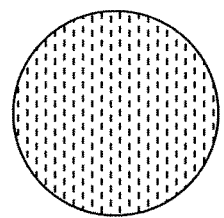
Figure 7:
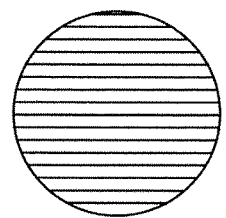
Figure 7:
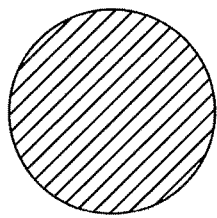
Figure 7:
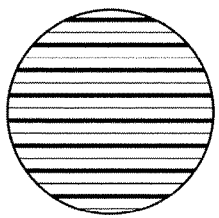
Figure 7:
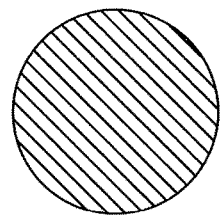
Figure 7:
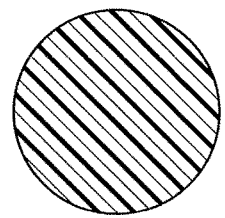

On the reverse side of each theory card, fingering card, or chord card there is illustrated a diagram 31 of a keyboard with dots of color 32 on the keys featured on the first side of that theory card, fingering card or chord card. Inside each of these colored dots 32 is the note of the key the dot is on. On the first side above the key indicator symbols 2 there are note indicator symbols 7 containing an alphabetic representation of the note of each key indicator symbol respectively. Note indicator symbols 7 are rectangular and colored in the color of the piano card. The color of the piano card is denoted by the key that the piano card is in and color coded to the musicmade EZ™ music wheel 41. Shown in FIG. 3A is music wheel 41 with the keys of C at a 12 o'clock position colored yellow 80, G at 1 o'clock position colored light green 81, D at 2 o'clock position colored dark green 82, A at 3 o'clock position colored bluish green 83, E at 4 o'clock position colored bright blue 84, B/C♭ at 5 o'clock position colored darker blue 85, G♭/F♯ at 6 o'clock position colored navy blue 86, D♭/C♯ at 7 o'clock position colored purple 87, A♭ at 8 o'clock position colored red 88, E♭ at 9 o'clock position colored reddish orange 89, B♭ at 10 o'clock position colored orange 90, F at 11 o'clock position colored yellowish orange 91.

Corresponding left hand major scales theory cards are shown linked to each position of the music wheel 41 with lines. The color of the position on the wheel 41 is the color of the note indicators and also the color of scale indicators and the color of the note dots 32 on the second sides of all piano theory cards, fingering cards 17 and all chord cards. This color coordination allows a pianist to easily find the desired key and scale.

The system has a variety of musical theory card doublets 29. Each musical theory card doublet 29 has one right hand piano card 10 and one left hand piano card 45.

Each musical theory card doublet 29 has key indicators 2 specific to only the musical notes of the musical scale of a given musical theory card doublet.

Right hand theory piano cards 10 indicate keys of a musical scale to be played by a pianist's right hand and contain a scale indicator symbol to the far right on each right hand theory piano card.

Left hand theory piano cards 11 indicate keys of that musical scale to be played by a pianist's left hand and contain a scale indicator symbol to the far left on each left hand theory piano card.

All piano cards have key indicators 2 that when properly configured spatially align the key indicators 2 with piano keys to be played of a musical scale. There are two types of key indicator symbols; ebony indicator symbols 47, ivory indicator symbols 49. Ebony indicator symbols 47 indicate ebony keys of a piano to be played of the musical scale. Ivory indicator symbols 49 indicate a group of ivory keys of a piano to be played. When all ebony indicator symbols 47 are pointing to ebony keys of a piano and all ivory indicator symbols 47 are pointing to ivory keys of a piano the piano card is configured. The group of ebony keys' notes and the group of ivory keys' notes combine to form a musical scale. The reverse or second side of piano cards contain a keyboard diagram 31 with note indicator dot 32 symbols indicating a correct placement of the piano cards. Note indicator symbol dots 32 contain an alphabetic representation of the note of each key indicator symbol respectively.

Fingering piano cards 17 are piano cards in which key indicator symbols further contain fingering indicator symbols 50 inside the triangular key indicator symbols. Fingering indicator symbols 50 indicate to a pianist which finger is to be used to strike each key respectively.

Theory piano cards 15 have key indicator symbols that contain degree indicator symbols. Degree indicator symbols indicate to a pianist which degree of the scale featured is associated with each key respectively.

There are also included a number of chord card doublets. Each chord card doublet contains information and notes pertaining to its particular musical chord. The chord piano cards have a variety of musical chord card doublets 30. Each musical chord card doublet has one right hand piano card and one left hand piano card.

Each musical chord card doublet 30 has chord indicators 74 specific to only the musical notes of the musical chord of a given musical chord card doublet. Right handed chord cards 68 have chord indicator symbols 70 colored in the color coding color of that card on the right side of that chord card. Right hand chord piano cards indicate keys of a musical chord to be played by a pianist's right hand. Left hand chord piano cards indicate keys of the musical chord to be played by the pianist's left hand. Left handed chord cards have chord indicator symbols on the left hand side of that chord card.

Chord key indicators 74 when properly configured spatially align the chord card key indicators 74 with piano keys to be played of a musical chord.

All piano cards are color coded to a music wheel 41. This music wheel 41 is composed of the circle of fifths known to musicians with the key of:

C at the 12 o'clock position Colored Yellow 80,
G at 1 o'clock position colored light green 81,
D at 2 o'clock position colored dark green 82,
A at 3 o'clock position colored bluish green 83.
E at 4 o'clock position colored bright blue 84,
B,C♭ at 5 o'clock position colored darker blue 85,
G♭, F♯ at 6 o'clock position colored navy blue 86,
D♭, C♯ at 7 o'clock position colored purple 87,
A♭ at 8 o'clock position colored red 88,
E♭ at 9 o'clock position colored reddish orange 89,
B♭ at 10 o'clock position and colored orange 90,
F at 11 o'clock position colored yellowish orange 91, Each key on the wheel 41 corresponds to a set of piano cards comprising fingering piano card doublets 28, theory card doublets 29 and chord piano card doublets 30.

The note indicator symbols 7 are colored in the key each piano card doublet corresponds to and the key of each piano card.

Musical scales currently offered are organized in various styles known as mode set. There are 12 mode sets. For the purposes of this application a mode set is defined as different kinds of scales including all modes and scales listed but not limited to:

Ionian (Major scale),
Dorian (Major scale starting on the 2nd degree),
Phrygian (Major scale starting on the 3rd degree),
Lydian (Major scale starting on the 4th degree),
Mixolydian (Major scale starting on the 5th degree),
Aeolian (Minor Scale-Major scale starting on the 6th degree),
Locrian (Major scale starting on the 7th degree),
Minor Scale,
Harmonic Minor Scale,
Melodic minor Scale,
Major Pentatonic Scale,
Minor Pentatonic Scale,
And Blues Scale.

Mode sets is a term specific to this application, however, the modes and other scales, are known to the art. Each of these mode sets has its own packet of theory card doublets 29 and its own packet of fingering card doublets 28. Each packet has piano card doublets of each key of the music wheel 41 and each key of the circle of fifths. Shown in FIG. 4(A-L) is one full mode set of theory cards as would be found in one packet. One full mode set of fingering cards 17 of that mode set would be similar with the major difference being the mode set packet would have fingering cards instead of theory cards.

Theory card doublets 29 and fingering card doublets 28 of every key of the music wheel 41 are packaged together in packets. Each packet has one mode set in it. Every mode set has its own packet of theory card doublets 29. All theory cards in one packet 78 can be seen in FIG. 4(A-L). Fingering card doublets 28 of every key of the music wheel 41 are packaged together in packets. Each packet has one mode set in it. Every mode set has its own packet for fingering card doublets 28.

A presently preferred method of learning music and piano from this apparatus has the steps of:

An aspiring pianist chooses a musical key from the music wheel 41, then finds the associated fingering cards 17 using color coding to find the fingering card doublet 28 desired key in that set. Student then looks at the second side of the fingering card doublet 28 and uses the diagrams on the back of each piano card to align each card. The left fingering card is aligned on a lower octave, the right fingering card is aligned on a higher octave.

The student then turns the fingering card doublet 28 to its first side and places the fingering card doublet 28 on a convenient ledge on the piano such as a nameboard rail and aligns the cards checking that each ebony key indicator 12 points to a black key 100 and each ivory key indicator 20 points to a white key 101. Student then plays keys indicated by the key indicators 2 from left to right with fingers indicated by the fingering indicator symbols 50. Student then plays the keys of the fingering card doublet 28 right to left. Then student plays fingering card doublet 28 left to right and right to left until desired proficiency is reached. Student then finds the packet of theory cards for the set of fingering cards of the same mode set and key the student was using. Student then looks at the second side of the theory card doublet 29 and uses the diagrams on the back of each piano card to align each card. The left theory card is aligned on a lower octave, the right theory card is aligned on a higher octave. The student then turns the theory card doublet 29 to its first side and places the theory card doublet 29 on a convenient ledge on the piano and aligns 99 checking that each ebony key indicator 12 points to a black key 100 and each ivory key indicator 20 points to a white key 101. Student then plays the keys indicated by the key indicators 2 from left to right as before but taking note of degrees of the scale of that theory card doublet 29. Student then plays the keys of the theory card doublet 29 right to left. Student then plays theory card doublet 29 left to right and right to left until desired proficiency is reached and the student is familiar with degrees of the scale of that theory card doublet 29. Student then finds the chord card packet for the mode set of the theory card doublet 29 just played. Using color coding student finds chord cards of the desired key in the chord card packet. Student then looks at the second side of the chord cards and uses the diagrams of piano keys to align cards. The student then turns the chord cards to their first side and places the chord cards on a convenient ledge such as a nameboard rail on the piano and aligns checking that each ebony key indicator 12 points to a black key 100 and each ivory key indicator 20 points to a white key. Student then plays the keys indicated by the chord card key indicators 74 together until desired proficiency is reached. Student then finds another chord card and repeats the steps of: finding a chord card packet for the mode set of the theory card doublet 29 just played, using color coding student finds chord cards of the desired key in the chord card packet, student then looks at the second side of the chord cards and uses the diagrams of piano keys to align those cards. The student then turns the chord cards to their first side and places the chord cards on a convenient ledge on the piano and aligns checking that each ebony key indicator 12 points to a black key 100 and each ivory key indicator points to a white key. Student then plays keys indicated by the key indicators together until desired proficiency is reached until all chord cards of that mode set are learned. Student then repeats these steps with different musical keys and different mode sets until all mode sets in all keys are learned to a desired proficiency.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising:
    piano cards having a first and second side, said first side comprising key indicators, said key indicators when properly configured spatially align with piano keys of a musical scale to be played, said key indicators comprising:
        ebony indicator symbols and ivory indicator symbols;
            said ebony indicator symbols indicate ebony keys of a piano to be played of said musical scale, said ivory indicator symbols indicate a group of ivory keys of a piano to be played, when all said ebony indicator symbols are aligned with a group of ebony keys of a piano and all of said ivory indicator symbols are aligned with ivory keys of said piano said piano card is configured, said group of ebony keys and said group of ivory keys combine to form a musical scale,
        said piano cards comprising a number of piano card doublets, each said piano card containing information and notes pertaining to a particular musical scale,
    said apparatus further comprising:
        a variety of said piano card doublets each said musical card doublet has one right hand piano card and one left hand piano card, each said piano card doublet has said key indicators specific to only the musical notes of the musical scale of a given piano card doublet, said right hand piano cards that indicate keys of said musical scale to be played by a pianist's right hand and said left hand piano cards that indicate keys of said musical scale to be played by said pianist's left hand.

2. Apparatus as described in claim 1 wherein said key indicator symbols further comprise note indicator symbols, containing an alphabetic representation of the note of each key indicator symbol respectively.

3. Apparatus as described in claim 2 wherein said piano card doublets further comprise fingering card doublets;
    said fingering card doublets are piano card doublets wherein said key indicator symbols further comprise fingering indicator symbols,
        said fingering indicator symbols indicate to a pianist which finger is to be used to strike each key respectively.

4. Apparatus as described in claim 3 wherein said fingering indicator symbols comprise numbers from 1 to 5,
    said numbers designate which finger is to be played with: "1" designating thumb, "2" designating index finger, "3" designating middle finger, "4" designating ring finger and "5" designating pinky finger respectively.

5. Apparatus as described in claim 4 wherein said piano card doublets further comprise theory card doublets;
    said theory card doublets are piano card doublets wherein said key indicator symbols further comprise degree indicator symbols,
        said degree indicator symbols indicate, to a pianist, which degree of said scale featured, in said theory card doublet, is associated with each key respectively.

6. Apparatus as described in claim 5, further comprising, a number of chord cards, each having a first and second side,
    said first side of said chord card comprising, information and notes pertaining to a particular musical chord;
        each chord card having a number of chord card key indicators,
            said chord card key indicators indicate to a pianist specific musical notes to be played of the musical chord of a given chord card;
            said chord card key indicators, when properly configured, spatially align; said chord card key indicators with piano keys to be played of a musical chord;
        said chord card key indicators comprise:
            ebony chord key indicator symbols and ivory chord key indicator symbols;
                said ebony chord key indicator symbols indicate ebony keys of a piano to be played of said musical chord,
                said ivory chord key indicator symbols indicate a group ivory keys of a piano to be played of said musical chord;
                when all said ebony chord key indicator symbols are aligned with a correct group of ebony keys, of a piano, and all of said ivory chord key indicator symbols are aligned with correct group of ivory keys, of said piano, said piano card is configured;
                when all said ebony chord key indicator symbols are aligned correctly said ivory chord key indicator symbols point to ivory keys of a piano and
                said ebony chord key indicator symbols point to ebony keys of a piano and at least one note has been checked to be correct said chord card is configured;
            said correct group of ebony keys and said correct group of ivory keys combine to form a musical chord and there may be three of these same chords found on each piano in different octaves,
        chord key indicator symbols contain degree symbols;
            said degree symbols indicate to a pianist the degree of the scale of each key to be played of said chord card;
            said chord key indicator symbols further comprise chord note indicator symbols,
            said chord note indicator symbols contain alphabetic notation of notes played in said chord.

7. Apparatus as described in claim 6, wherein said piano cards and chord cards are color coded to a music wheel,
    Said music wheel is comprised of the circle of fifths known to musicians with the key of:
        C at the 12 o'clock position, G at 1 o'clock position,
D at 2 o'clock position,
A at 3 o'clock position,
E at 4 o'clock position,
B at 5 o'clock position,
F♯ at 6 o'clock position,
D♭ at 7 o'clock position,
A♭ at 8 o'clock position,
E♭ at 9 o'clock position,
B♭ at 10 o'clock position and
F at 11 o'clock position
each key on said wheel corresponds to a key color,
  each of said key colors corresponds to a set of fingering card doublets, theory card doublets and chord piano cards,
    said note indicator symbols and said chord note indicator symbols are colored in the key color each piano card set corresponds.

8. Apparatus as described in claim 7 wherein said
piano cards and said chord cards have a height in the range between one and three inches;
  preferably 1⅝ inches and a length in a range between seven and nine inches;
  preferably about 8 inches long.

9. Apparatus as described in claim 8 wherein said
key indicator symbols and said chord key indicator symbols comprise the shape of isosceles triangles pointed downwards towards said keys being indicated,
  said ebony key indicator symbols and said ebony chord key indicator symbols are colored in black,
  said ivory key indicator symbols and said ivory chord key indicator symbols are colored in white.

10. Apparatus as described in claim 9 wherein, said note indicator symbols and said chord note indicator symbols comprise the shape of a rectangle just above said isosceles triangle shape;
  said rectangle contains said alphabetic notation of said note indicated inside said rectangle and
  said rectangles are colored in that cards key color.

11. Apparatus as described in claim 10 wherein, said piano cards' second sides comprise a diagram of piano keys;
  said diagram of piano keys having indicator dots;
  said indicator dots show a pianist where to place the piano card;
  said chord cards' second sides comprise a diagram of piano keys for chords;
    said diagram of piano keys for chords having indicator dots on said keys of said diagram;
    said indicator dots show a pianist where to place said chord card on said piano.

12. Apparatus as described in claim 11 wherein theory card doublets, of every key, of said music wheel, are packaged together in packets;
  each said packet has one mode set in it;
  every mode set has its own packet for theory card doublets;
  fingering card doublets, of every key, of said music wheel, are packaged together in packets;
  each said packet has one mode set in it and every mode set has its own packet for fingering card doublets;
  said chord cards have a left cord card and a right chord card creating chord card doublets;
  said chord card doublets, of every chord, are packaged together in packets.

13. Apparatus as described in claim 12 comprising the steps of:
  a pianist chooses a musical key from said music wheel;
  finds said associated fingering cards;
  uses said color coding to find the fingering card doublet desired key in that mode set;
  student then looks at said second side of fingering card doublet and uses said diagrams on the back of each piano card to align each card;
  said left fingering card is aligned on a lower octave;
  said right fingering card is aligned on a higher octave;
  said student then turns said fingering card doublet to its first side and places said fingering card doublet on a convenient ledge on said piano and aligns checking that each ebony key indicator points to a black key and each ivory key indicator points to a white key;
  student then plays keys indicated by said key indicators from left to right with fingers indicated by said fingering indicator symbols;
  student then plays said keys of said fingering card doublet right to left similarly;
  student then plays fingering card doublet left to right and right to left until desired proficiency is reached;
  student then finds the packet of theory cards for that set of fingering cards that student was using;
  using color coding said student finds the theory card doublet associated with said fingering card doublet that was just used;
  student then looks at said second side of said theory card doublet and uses said diagrams on the back of each piano card to align each card;
    said left theory card is aligned on a lower octave;
    said right theory card aligned on a higher octave;
  said student then turns said theory card doublet to its first side and places said theory card doublet on a convenient ledge on said piano and aligns checking that each ebony key indicator points to a black key and each ivory key indicator points to a white key;
  student then plays keys indicated by said key indicators from left to right as before but taking note of degrees of the scale of that said theory card doublet;
  student then plays said keys of said theory card doublet right to left;
student plays theory card doublet left to right and right to left until desired proficiency is reached and said student is familiar with degrees of the scale of that theory card doublet;
  student then finds chord card packet for the mode set of the theory card doublet just played;
  using color coding student finds chord cards of said desired key in said chord card packet;
  student then looks at said second side of said chord cards and uses said diagrams of piano keys to align card;
  said student then turns said chord cards to its first side and places said chord card on a convenient ledge on said piano and aligns checking that each ebony key indicator points to a black key and each ivory key indicator points to a white key;
  student then plays keys indicated by said key indicators together until desired proficiency is reached student then finds another chord card and repeats the steps of:
    student then finds chord card packet for the mode set of the theory card doublet just played;
    using color coding student finds chord cards of said desired key in said chord card packet;
    student then looks at said second side of said chord cards and uses said diagrams of piano keys to align card;
    said student then turns said chord cards to its first side and places said chord card on a convenient ledge on said piano and aligns checking that each ebony key indicator points to a black key and each ivory key indicator points to a white key;

student then plays keys indicated by said key indicators together until desired proficiency is reached until all chord cards of that mode set are learned;

student then repeats these steps with different musical keys and different mode sets until all mode sets in all keys are learned to a desired proficiency.

\* \* \* \* \*